United States Patent [19]

Hattori

[11] Patent Number: 5,034,875
[45] Date of Patent: Jul. 23, 1991

[54] VOLTAGE MULTIPLIER CIRCUIT
[75] Inventor: Masayuki Hattori, Tokyo, Japan
[73] Assignee: NEC Corporation, Tokyo, Japan
[21] Appl. No.: 463,030
[22] Filed: Jan. 10, 1990
[30] Foreign Application Priority Data
  Jan. 11, 1989 [JP] Japan ................................ 1-5101
[51] Int. Cl.[5] ............................................ H02M 3/07
[52] U.S. Cl. ...................................... 363/60; 307/571
[58] Field of Search ................... 307/296.5, 296.8, 571;
  363/59, 60
[56] References Cited
U.S. PATENT DOCUMENTS
  4,888,505  12/1989  Skovmand ..................... 307/296.8
  4,890,020  12/1989  Bird .................................. 307/571
FOREIGN PATENT DOCUMENTS
  65815  5/1977  Japan ..................................... 363/60

Primary Examiner—William H. Beha, Jr.
Attorney, Agent, or Firm—Helfgott & Karas

[57] ABSTRACT

A voltage multiplier circuit of the present invention includes a first power supply line, an oscillator circuit connected to the first power supply line, a serial circuit composed of an inverter for receiving the output of the oscillator circuit, the first capacitor for receiving the output of the inverter and the first and the second diodes, an output circuit and a second capacitor both connected to the output of the serial circuit, a third capacitor connected between the input terminal of the inverter, and the connection point of the first and the second diodes, a first Zener diode connected between the connection point of the first capacitor and the first diode, and the second power supply, a second Zener diode connected between the second power supply line, and the connection point of the first and the second diode, a third Zener diode connected between the first and the second power supply lines, and a fourth Zener diode connected between the second power supply line and the third power supply line connected to the output circuit.

14 Claims, 6 Drawing Sheets

VOLTAGE MULTIPLIER CIRCUIT

BACKGROUND OF THE INVENTION

1. Field of the Invention

The present invention relates to a voltage multiplier circuit and, more particularly, to a voltage multiplier circuit built in a semiconductor integrated circuit for a motor driver circuit of a floppy disk drive (FDD) or hard disk drive (HDD) comprising an H-bridge circuit composed of four N-channel field effect transistors as an output stage and further utilizing the separate power supplies for control and for the output stage.

2. Description of the Related Art

An example of the aforementioned semiconductor device for a motor driver circuit is disclosed in an article entitled "SMARTPOWER MOTOR DRIVER FOR LOW VOLTAGE APPLICATIONS", by D. Cave et al., IEEE 1987 CUSTOM INTEGRATED CIRCUITS CONFERENCE, pp. 276-279. The voltage multiplier circuit built in semiconductor device in prior art is composed of a combination of diodes, capacitors and an oscillator, as is shown in FIG. 1. Referring to FIG. 1, the output of an oscillator circuit 10 driven by a power supply line 9 is applied through a serial circuit composed of an inverter 3 and diodes 7, 8 and 18 to the gate of an N-channel transistor (not shown) in an output circuit 12 and also to one of the electrodes of a capacitor 6, the other electrode of which is grounded. By connecting a capacitor 4 between input of the inverter 3 and the connection point (a) of the diodes 7 and 8, and also a capacitor 5 between output of the inverter 3 and the connection point (b) of the diodes 8 and 18, the multiplied voltage is obtained at the connection point (c) of the diode 18 and the capacitor 6.

An example of the oscillator circuit 10 in FIG. 1 is shown in FIG. 2(a), where the inverters 19, 20 and 21 are connected in series, and moreover a resistor 23 is connected between input and output of the inverter 19, and a capacitor 22 is connected between input of the inverter 19 and output of the inverter 20.

Now, the operation of the circuit shown in FIG. 1 will be explained. Referring again to FIG. 1, a rectangular wave shown in FIG. 2(b) is generated by the oscillator 10 and is phase-inverted by the inverter 3. The diodes 7, 8 and 18 prevent the inverse flow of electric current. Initially, the voltage at the connection point (a) between diodes 7 and 8 becomes equal to voltage of the power supply line 9 (normally 5 volts), so that the capacitors 4 and 5 are pre-charged to 5 volts. When the output of the oscillator 10 becomes 5 volts, the voltage at point (a) is raised to 10 volts. Consequently, the voltage at point (b) also becomes 10 volts. According to the same principle, when the output of the inverter 3 becomes 5 volts, the voltage at point (b) is raised to 15 volts, that is, the voltage at point (c) becomes 15 volts.

The defects of the circuit of prior art mentioned above is that the time taken to build up the voltage at point (c) is long, because the charging of the capacitor 6 begins after the oscillator starts to operate and that the gate electrode of the output MOS transistor may be broken due to the spike noise generated at the signal switching instant, because the voltage three times as high as power supply voltage is applied to it.

SUMMARY OF THE INVENTION

Therefore, an object of the present invention is to provide a voltage multiplier circuit having the short building-up time and capable of preventing the gate insulator break-down of the output transistor.

A voltage multiplier circuit of the present invention includes a first power supply line, a second power supply line, a third power supply line, a fourth power supply line connected between the second and the third power supply lines, an oscillator circuit connected between the first and the second power supply lines, an output circuit connected between the first and the third power supply lines, a first capacitor, one of its two electrodes being connected to the output of the oscillator, a Zener diode connected between the other electrode of the first capacitor and the fourth power supply line a diode, one of its two electrodes being connected to both the other electrode of the first capacitor and to the Zener diode and the other electrode being connected to the input terminal of the output circuit, and a second capacitor connected between the connection point of the diode and the input terminal of the output circuit and the first power supply line.

Since the fourth power supply line and the second capacitor are mutually connected through the Zener diode and the diode, the potential of the second capacitor can be charged to raise the voltage across its both ends, in advance to the rise of the voltage at the fourth power supply line, resulting in shortening the builting-up time. Furthermore, since a Zener diode has the excessive voltage absorption function, the transistor in the output circuit is protected from the excessive voltage break-down.

In addition, the voltage at the fourth power supply line or the voltage across the second capacitor is raised in advance to the voltage increments at the second and the third power supply lines, by inserting additional Zener diodes between the second and the fourth power supply lines, and between the third and the fourth power supply lines, respectively. In a case where the voltage multiplier circuit of the present invention is used for a motor driver circuit of the floppy disk drive or the hard disk drive, the voltage at the third power supply line for driving the output circuit is high higher than the second power supply line. Even in such case, the present invention can provide a voltage much higher than the third power supply line to the floppy disk drive or the hard disk drive through the diode.

Also, if a resistor is inserted between the Zener diode and the fourth power supply line, the power supply source can effectively be protected, when the second capacitor is short-circuited to make a low impedance paths between the first and second power supply lines and between the first and third power supply lines.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

Figure 2A:
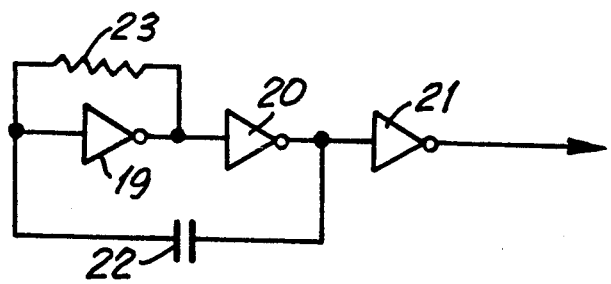
FIG. 2(a) is a circuit diagram for explaining an oscillator circuit used in both an embodiment of the present invention and in the circuit of prior art.
Figure 2B:
FIG. 2(b) is a waveform diagram illustrating the output waveform generated by the oscillator circuit shown in FIG. 2(a)
Figure 3:
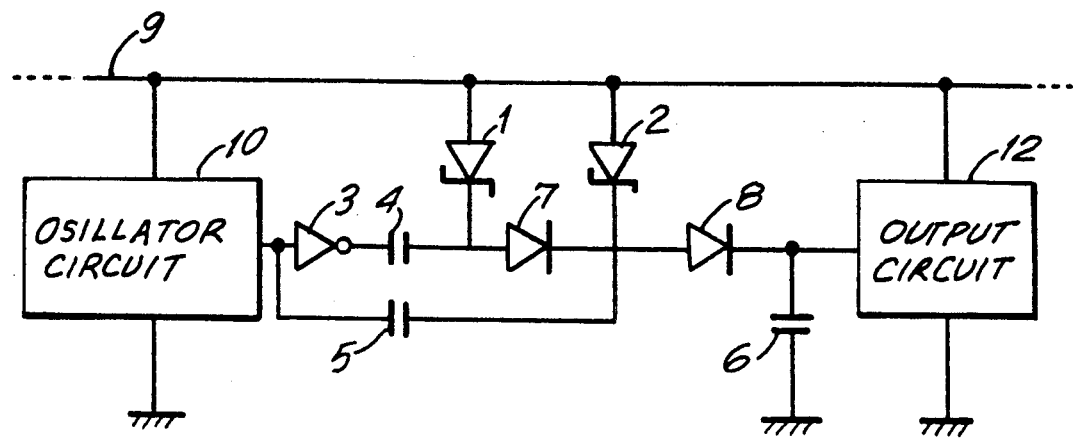
FIGS. 3, 5, 7, and 8 are the circuit diagrams for explaining the voltage multiplier circuits of the embodiments of the present invention.

Referring to FIG. 3, an oscillator circuit 10 is powered by a power supply line 9. The oscillator circuit shown in FIG. 2(a) is an example usable as the oscillator circuit 10. The output of the oscillator circuit 10 is applied to the gate of an output transistor (not shown) in an output circuit 12 and also to a capacitor 6 through a serial circuit composed of an inverter 3, a capacitor 4, the diodes 7 and 8. A capacitor 5 is connected between the input terminal of the inverter 3 and the connection point of the diodes 7 and 8. Both electrodes of the diode 7 are connected to the power supply line 9 through the Zener diodes 1 and 2, respectively. Since the capacitor 6 is pre-charged to the voltage of the power supply line 9 through Zener diode 2 and the diode 8, the time required to build up the multiplied voltage across capacitor 6 can be made short. As is the same in the circuit of prior art shown in FIG. 1, the function of the diodes 7 and 8, and the Zener diodes 1 and 2 is the prevention of the reverse flow of the electric current. In addition, the function of the excessive voltage absorption is also attained by properly selecting the Zener voltages of the Zener diodes 1 and 2. Therefore, since the additional excessive voltage protection circuit is dispensable, it is possible to realize a voltage multiplier circuit having the short building-up time and also the excessive voltage protection by means of the minimum required number of the elements.

Generally, the gate voltage of an N-channel field effect transistor used in the output circuit must be higher than the power supply voltage $V_M$ of the output circuit in order to make the transistor to have a small on-resistance. In the embodiment of the present invention, the voltage multiplier circuit is three times as high as the power supply voltage $V_C$ of the oscillator circuit 10. For example, if $V_C$ and $V_M$ are chosen to be 5 volts, the multiplied voltage becomes 15 volts, which is sufficient for driving the gate of the transistor in the output circuit.

Figure 1:
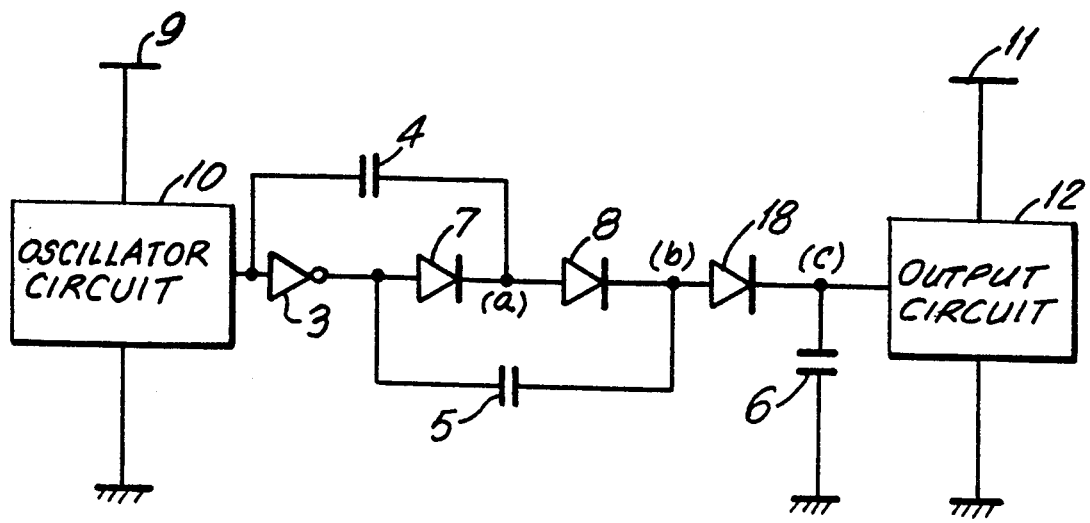
FIG. 1 is a circuit diagram for explaining a voltage multiplier circuit of prior art.
Figure 4:
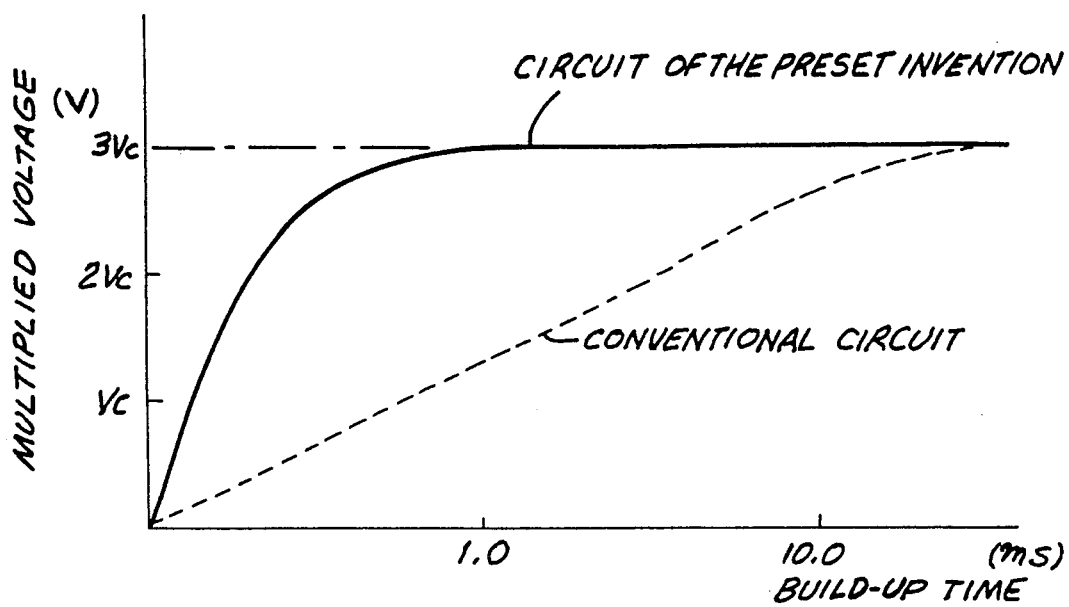
FIG. 4 is a diagram showing the building-up time versus multiplied voltage characteristics of the voltage multiplier circuit of FIG. 3.

FIG. 4 shows the building-up time versus multiplied voltage characteristics of the present circuit shown in FIG. 3 (solid line), in which that of the circuit of prior art shown in FIG. 1 (broken line) is also shown for comparison. By means of the voltage multiplier circuit shown in FIG. 3, the building-up time can be shortened one fifth as compared with the circuit of prior art.

Thus, when the power supply voltages $V_C$ and $V_M$ of the oscillator circuit 10 and of the output circuit 12 are mutually equal, the voltage multiplier circuit shown in FIG. 3 reveals the aforementioned preferable effect.

When the $V_M$ is higher than the $V_C$, as is the case where $V_C$ and $V_M$ are equal to 5 and 12 volts in the floppy disk or hard disk drive, however, the multiplied voltage 15 volts is insufficient to make the on-resistance of the field effect transistor small.

Figure 5:
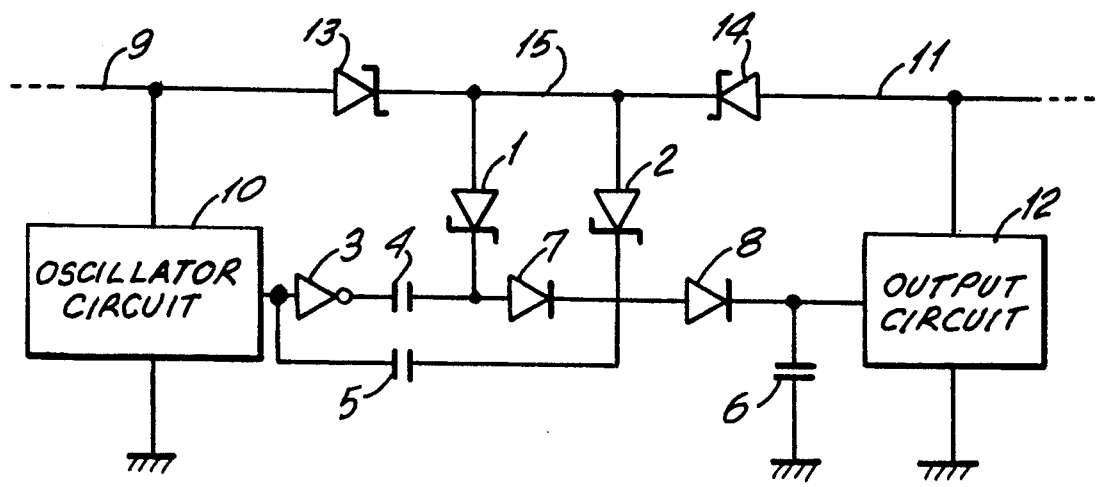

A circuit shown in FIG. 5 is an improved voltage multiplier circuit of FIG. 3. In FIG. 5, the same reference numerals are used for the same elements in FIG. 3. The oscillator circuit 10 is driven by the power supply line 9. The output of the oscillator 10 is applied to the output circuit 12 and the capacitor 6 through a serial circuit composed of the inverter 3, the capacitor 4, the diodes 7 and 8. The capacitor 5 is connected between the input terminal of the inverter 3 and the connection point of the diodes 7 and 8. Both electrodes of the diode 7 are connected to a power supply line 15 through Zener diodes 1 and 2, respectively. The power supply line 15 is connected to the power supply lines 9 and 11 through Zener diodes 13 and 14, respectively. Thus, the potential at the line 15 becomes the higher voltage than those of the lines 9 and 11, with the result that the multiplied voltage becomes twice as high as voltage at line 9 plus that at line 15.

Figure 6:
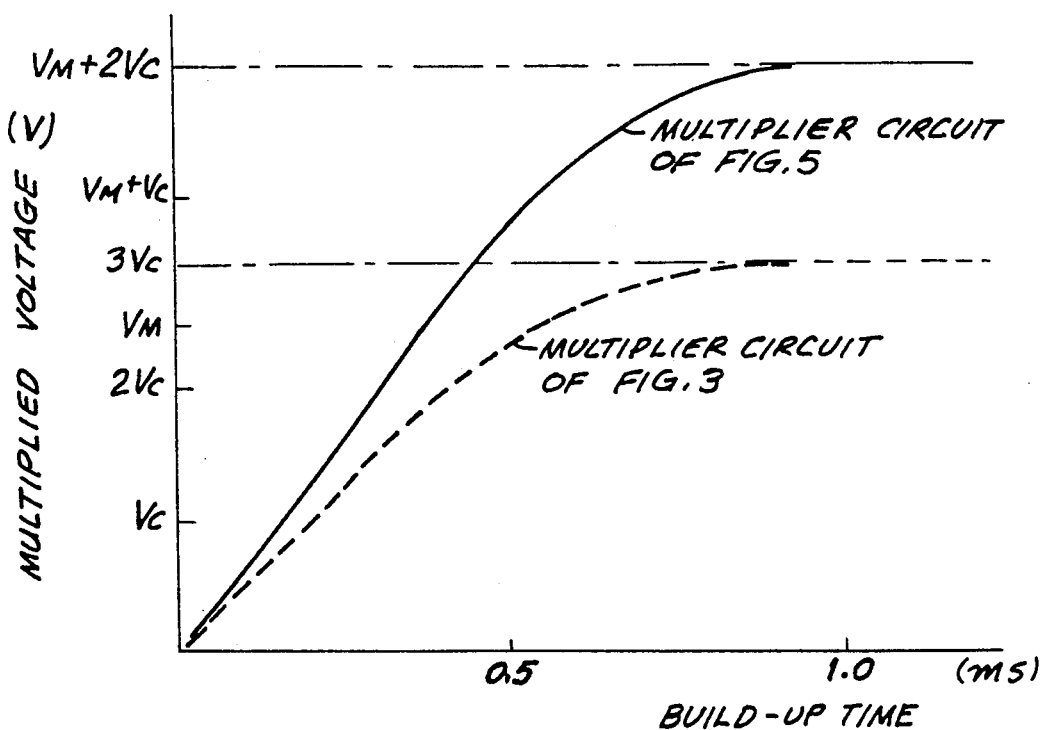
FIG. 6 is a diagram showing the building-up time versus multiplied voltage characteristics of the voltage multiplier circuit of FIG. 5.

FIG. 6 shows the building-up time versus multiplied voltage characteristics of the circuit shown in FIG. 5 for $V_M > V_C$ case (solid line), together with that of the circuit shown in FIG. 3 (broken line). Consequently, if the voltage multiplier circuit shown in FIG. 5 is used, the multiplied voltage becomes the power supply voltage $V_M$ of the output circuit 12 plus voltage twice as high as power supply voltage $V_C$, while the building-up time is not different from that of the circuit shown in FIG. 3.

Figure 7:
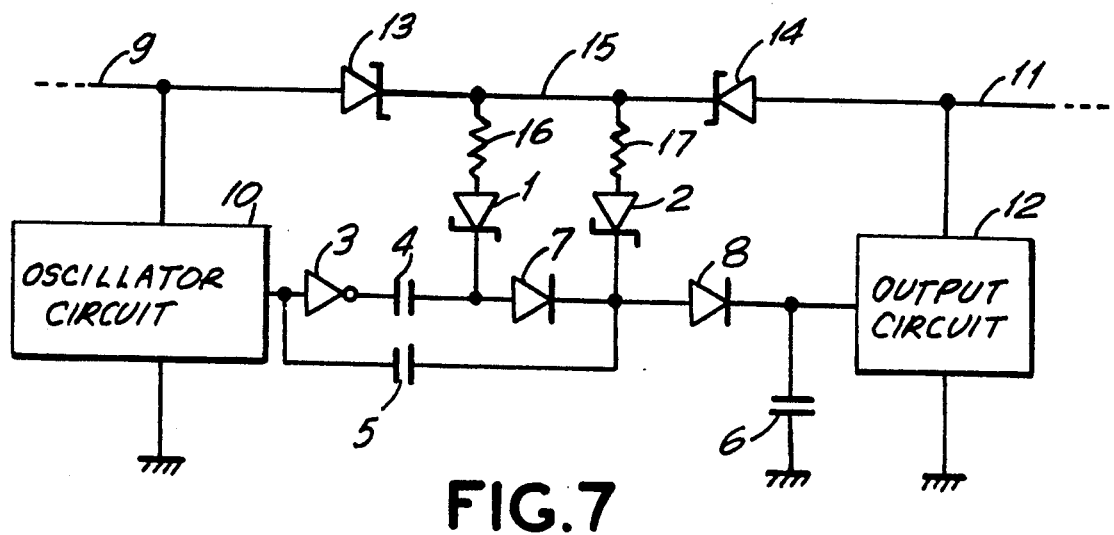

FIG. 7 is a circuit diagram of further embodiment of the present invention, in which the same reference numerals are used for the same elements in FIG. 5. Although the operation of the circuit is essentially the same as that shown in FIG. 5, the resistors 16 and 17 are inserted between Zener diodes 1 and 2, and the power supply line 15, respectively, in order to protect the power supply sources when the capacitor 6 is short-circuited. Thus, the voltage multiplier circuit having the same building-up time characteristics as shown in FIG. 6 and further having the power supply protection function can be realized.

Figure 8:
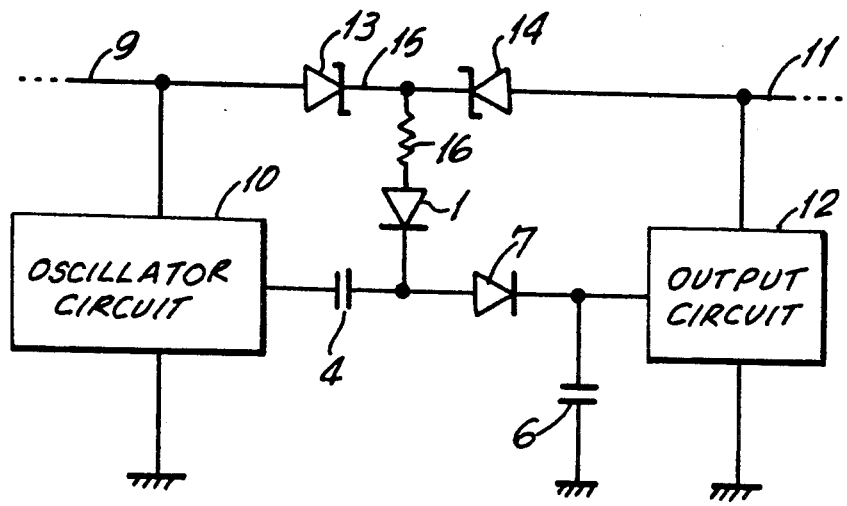

The circuits shown in FIGS. 3, 5 and 7 are the examples of the voltage multiplier circuits composed of two multiplier stages. These circuits are preferable for the floppy disk or hard disk drive, wherein 5 and 12 volts are used as power supplies $V_C$ and $V_M$. In FIG. 8, a voltage multiplier circuit similar to that shown in FIG. 7 but comprising single multiplier stage is shown. Similarly, the number of the multiplier stages can be changed according to the requirement.

Figure 9:
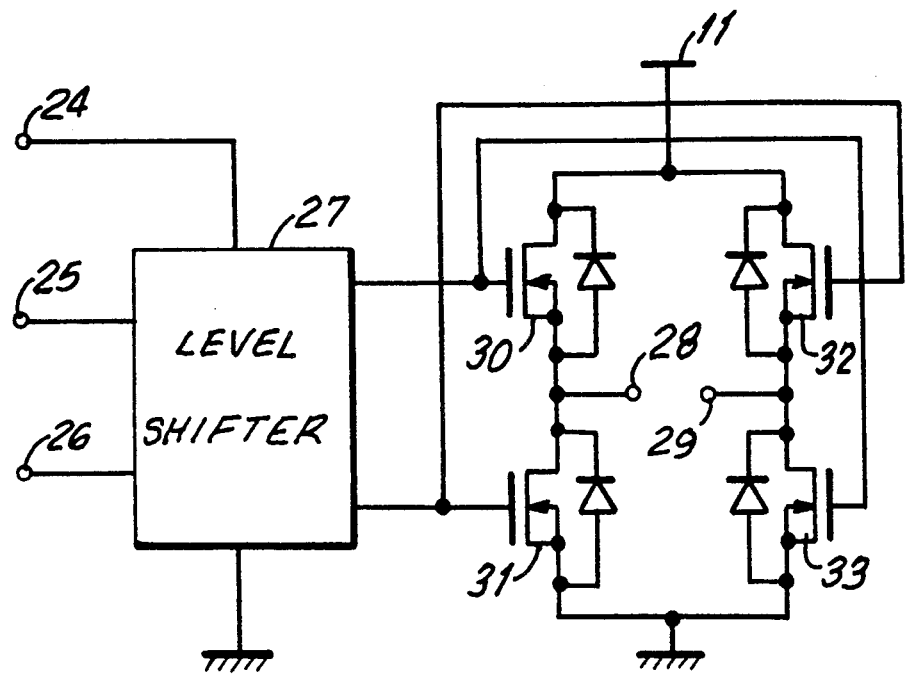
FIGS. 9, 10 and 11 are the circuit diagrams for explaining the output circuits used in the voltage multiplier circuits of the embodiments of the present invention.
Figure 10:
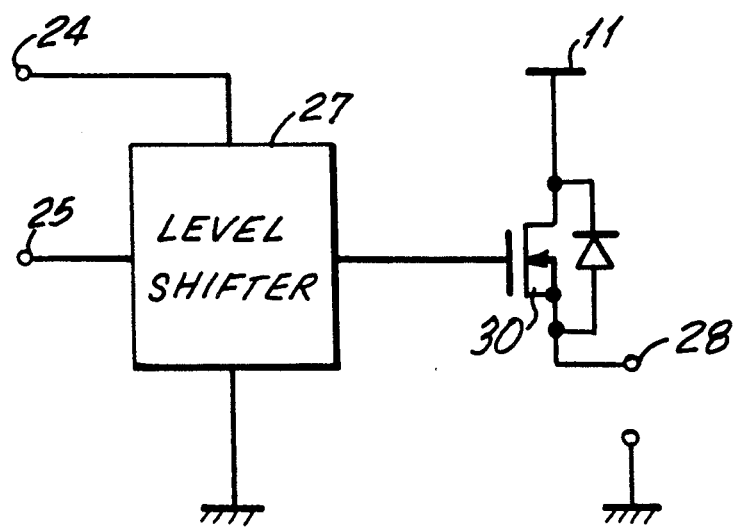
Figure 11:
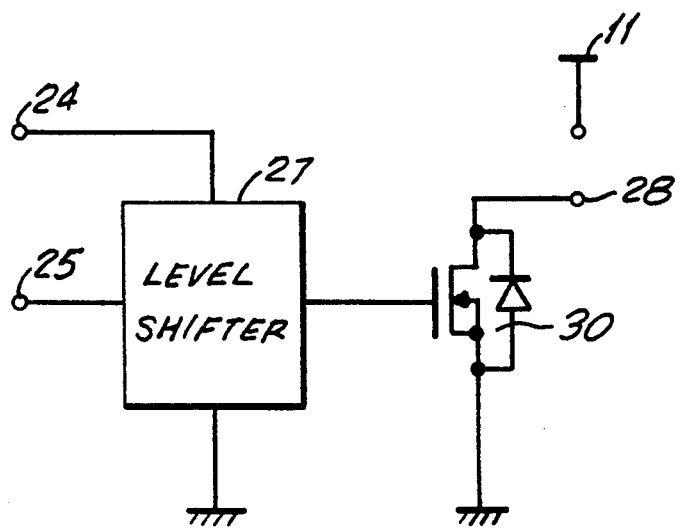

As the output circuit 12, an H-bridge structure composed of N-channel transistors 30, 31, 32 and 33 as shown in FIG. 9 can be used. Alternatively, the circuit comprising an N-channel transistor 30 either between the power supply line and an output terminal 28 as is shown in FIG. 10, or between the ground line and the output terminal 28 as is shown in FIG. 11 can be used. In these three circuits, the multiplied voltage from the voltage multiplier circuit is applied to a multiplied voltage input terminal 24 and then applied to the gate of the output transistor. This output transistor is controlled according to the status of the signals applied to the signal input terminals 25 and 26. The circuit shown in FIG. 9 is used for motor driver circuit, while the circuits shown in FIGS. 10 and 11 are used for the solenoid load.

Figure 12:
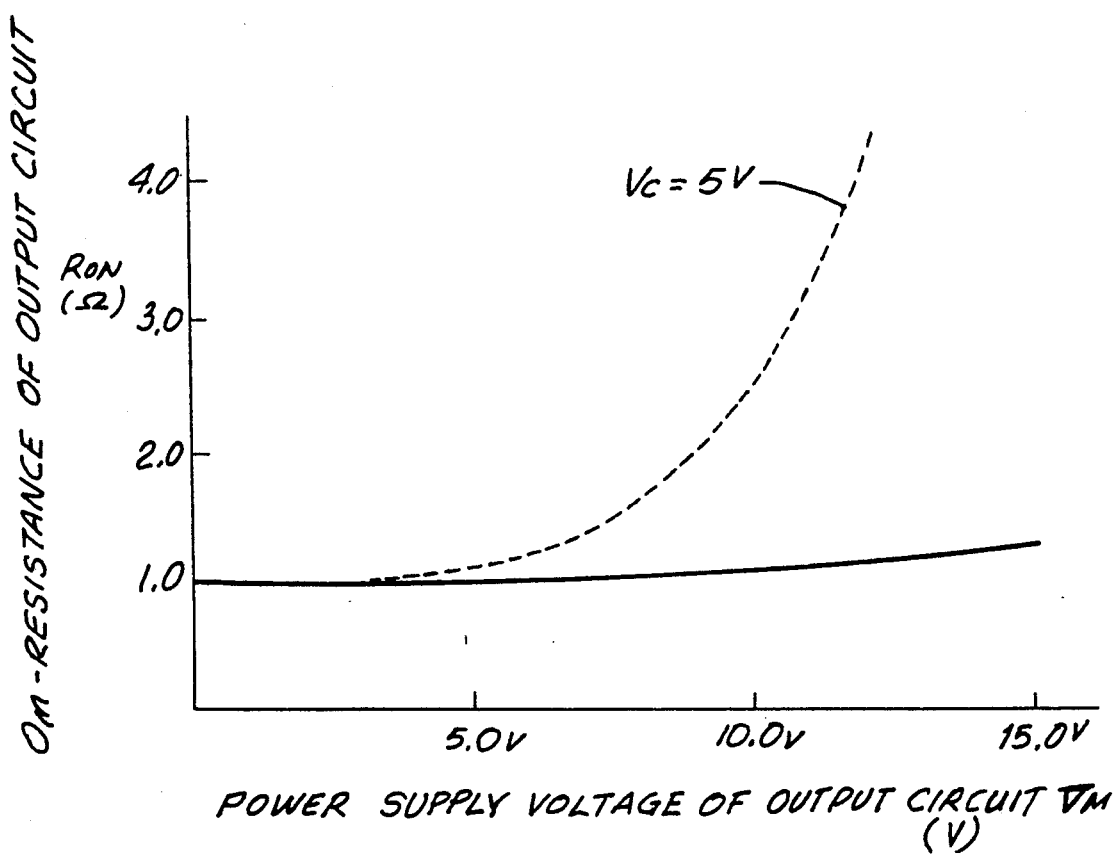
FIG. 12 shows the relation between the power supply voltage of the output circuit and the on-resistance of the output transistor.

FIG. 12 shows the relation between the on-resistance $R_{on}$ of the output circuit and the power supply voltage $V_M$ of the output circuit, when the H-bridge circuit shown in FIG. 9 is used as output circuit 12 in FIGS. 3 and 5, and when the power supply voltage $V_C$ of the line 9 for driving the oscillator circuit 10 is 5 volts. When the voltage multiplier circuit shown in FIG. 3 is used, the on-resistance $R_{on}$ increases as the power supply voltage $V_M$ of the output circuit 12 increases. On the contrary, when the circuit shown in FIG. 5 is used, the on-resistance $R_{on}$ changes little and is low even the voltage $V_M$ increases.

What is claimed is:

1. A voltage multiplier circuit comprising:
   a first power supply line;
   a second power supply line;
   a third power supply line;
   a fourth power supply line connected between said second power supply line and said third power supply line;
   an oscillator circuit connected between said first power supply line and said second power supply line;
   an output circuit connected between said first power supply line and said third power supply line;
   a first capacitor having one of its two electrodes connected to the output terminal of said oscillator circuit;
   a Zener diode connected between the remaining electrode of said first capacitor and said fourth power supply line;
   a diode having one of its two electrodes connected to the connection point of said remaining electrode of said first capacitor and said Zener diode and having the remaining electrode connected to the input terminal of said output circuit; and
   a second capacitor connected between the connection point of said remaining electrode of said diode and said input terminal of said output circuit and said first power supply line.

2. A voltage multiplier circuit as claimed in claim 1, further comprising:
   an inverter connected between said output terminal of said oscillator circuit and said one electrode of said first capacitor;
   an additional diode connected between said remaining electrode of said first capacitor and said one electrode of said diode;
   a first additional Zener diode connected between the connection point of said diode and said additional diode, and said fourth power supply line; and
   a third capacitor connected between the connection point of said output terminal of said oscillator circuit and said inverter and the connection point of said diode and said additional diode.

3. A voltage multiplier circuit as claimed in claim 2, further comprising:
   a second additional Zener diode connected between said second power supply line and said fourth power supply line; and
   a third additional Zener diode connected between said third power supply line and said fourth power supply line.

4. A voltage multiplier circuit as claimed in claim 3, further comprising:

a first resistor connected between said Zener diode and said fourth power supply line; and
   a second resistor connected between said first additional Zener diode and said fourth power supply line.

5. A voltage multiplier circuit as claimed in claim 2, further comprising:
   a first resistor connected between said Zener diode and said fourth power supply line; and
   a second resistor connected between said first additional Zener diode and said fourth power supply line.

6. A voltage multiplier circuit as claimed in claim 1, further comprising:
   a second additional Zener diode connected between said second power supply line and said fourth power supply line; and
   a third additional Zener diode connected between said third power supply line and said fourth power supply line.

7. A voltage multiplier circuit as claimed in claim 6, further comprising a resistor connected between said Zener diode and said fourth power supply line.

8. A voltage multiplier circuit as claimed in claim 1, further comprising a resistor connected between said Zener diode and said fourth power supply line.

9. A voltage multiplier circuit comprising:
   a first power supply line;
   a second power supply line;
   a third power supply line;
   a fourth power supply line connected between said second power supply line and said third power supply line;
   an oscillator circuit connected between said first power supply line and said second power supply line;
   an output circuit connected between said third power supply line and said first power supply line;
   an inverter connected to the output terminal of said oscillator circuit;
   a first capacitor having one of its two electrodes connected to the output terminal of said inverter;
   a first diode having one of its two electrodes connected to the remaining electrode of said first capacitor;
   a second diode connected between the remaining electrode of said first diode and the input terminal of said output circuit;
   a second capacitor connected between the connection point of said second diode and said input terminal of said output circuit, and said first power supply line;
   a third capacitor connected between the connection point of said oscillator circuit and said inverter, and the connection point of said first diode and said second diode;
   a first Zener diode connected between the connection point of said first capacitor and said first diode, and said fourth power supply line; and
   a second Zener diode connected between the connection point of said first diode and said second diode, and said fourth power supply line.

10. A voltage multiplier circuit as claimed in claim 9, further comprising:
    a third Zener diode connected between said second power supply line and said fourth power supply line; and a fourth Zener diode connected between said third power supply line and said fourth power supply line.

11. A voltage multiplier circuit as claimed in claim 10, further comprising:
a first resistor connected between said first Zener diode and said fourth power supply line; and
a second resistor connected between said second Zener diode and said fourth power supply line.

12. A voltage multiplier circuit as claimed in claim 9, further comprising:
a first resistor connected between said first Zener diode and said fourth power supply line; and
a second resistor connected between said second Zener diode and said fourth power supply line.

13. A voltage multiplier circuit comprising:
a first power supply line;
a second power supply line;
a third power supply line;
a fourth power supply line connected between said second power supply line and said third power supply line;
an oscillator circuit connected between said first power supply line and said second power supply line;
an output circuit connected between said third power supply line and said first power supply line;
an inverter connected to the output terminal of said oscillator circuit;
a first capacitor having one of its two electrodes connected to the output terminal of said oscillator circuit;
a first diode having one of its two electrodes connected to the remaining electrode of said first capacitor;
a second diode connected between the remaining electrode of said first diode and the input terminal of said output circuit;
a second capacitor connected between the connection point of said second diode and said input terminal of said output circuit, and said first power supply line;
a third capacitor connected between the connection point of said oscillator circuit and said inverter, and the connection point of said first diode and said second diode;
a first Zener diode connected between the connection point of said first capacitor and said first diode, and said fourth power supply line;
a second Zener diode connected between the connection point of said first diode and said second diode, and said fourth power supply line;
a third Zener diode connected between said second power supply line and said fourth power supply line; and
a fourth Zener diode connected between said third power supply line and said fourth power supply line.

14. A voltage multiplier circuit as claimed in claim 13, further comprising:
a first resistor connected between said first Zener diode and said fourth power supply line; and
a second resistor connected between said second Zener diode and said fourth power supply line.

* * * * *